Feb. 18, 1936.  R. S. BEGG  2,031,092
HUB CAP AND COVER
Filed Jan. 19, 1929
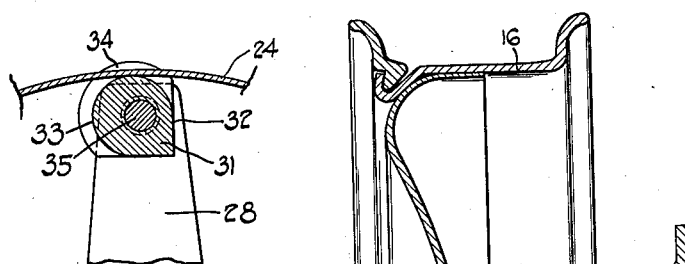
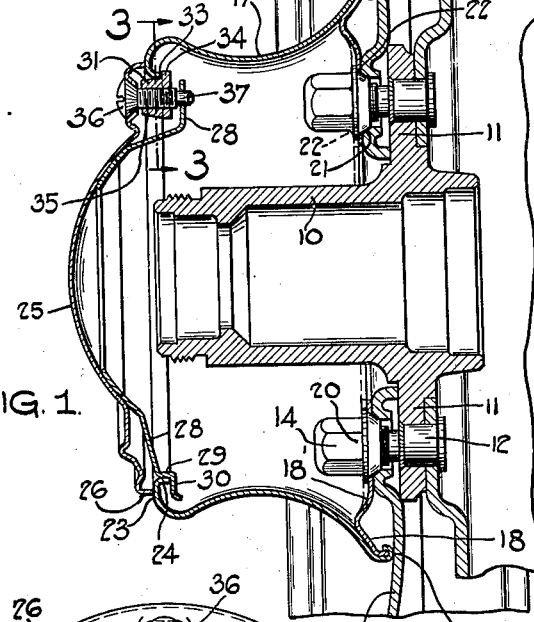
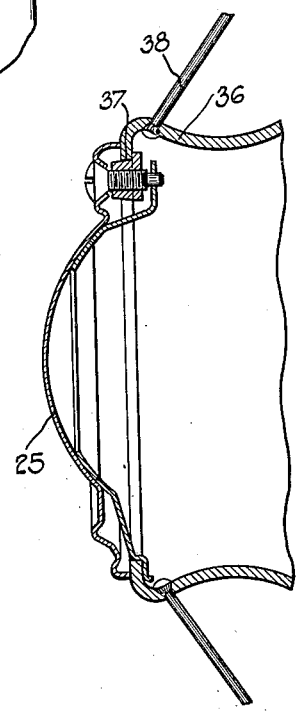
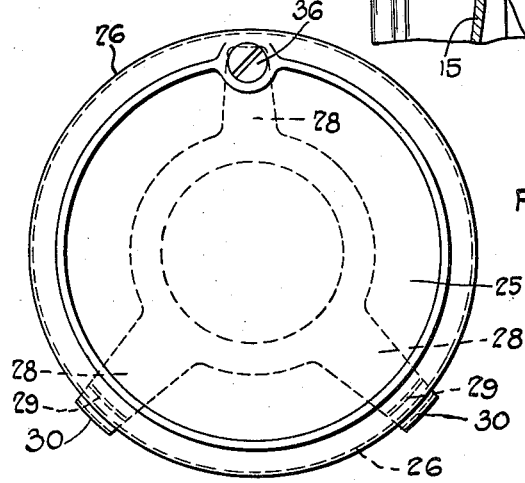
INVENTOR.
RUSSELL S. BEGG.
ATTORNEY.

Patented Feb. 18, 1936

2,031,092

UNITED STATES PATENT OFFICE 2,031,092

HUB CAP AND COVER

Russell S. Begg, Detroit, Mich., assignor to Budd Wheel Company, Philadelphia, Pa., a corporation of Pennsylvania Application January 19, 1929, Serial No. 333,727

5 Claims. (Cl. 301—37)

The invention relates to hub caps and covers and more particularly to hub caps and covers for concealing the attaching means of bolted-on wheels, that is, wheels demountably secured to the hub by an annular series of bolting means.

It is a main object of my invention to provide a cover of this class in which there is provided an end cap closure which is readily removable to permit access to the wheel securing means.

It is a further object of my invention to provide a cover of this class which is readily secured in place, and which when secured in place is positively held against rattling, and whose end cap closure is likewise positively held in place yet readily removable.

These and other objects and advantages are attained by the construction described in the following detailed description and shown in the accompanying drawing, although it will be understood that various changes and modifications and departures from the precise structure shown may be made without departing from the spirit of the invention as expressed in the claims appended hereto.

In the drawing, where I have shown the invention as applied to a disc type of demountable wheel, Fig. 1 is an axial section of a wheel with the invention applied.

Fig. 2 is a front elevation of the closure cap, and

Fig. 3 is a detail sectional view of the movable locking securing means for the closure cap, the section being taken approximately on the line 3—3 of Fig. 1.

Fig. 4 is a fragmentary axial sectional view showing the closure cap applied to a wire wheel hub shell.

The wheel to which the invention is shown applied comprises a hub 10 having a radial flange 11 upon which is demountably secured by an annular series of bolting devices, such as the studs 12 and nuts 14, the disc wheel body 15, carrying the rim or felly 16 at its periphery. These parts may all be of a usual construction, and need not be further described except as they coact with the novel cover for concealing the securing nuts, now to be described.

This cover comprises a barrel portion 17 having an internal diameter slightly larger than the diameter of the bolt circle through which the wheel is secured to the hub. This barrel portion has a curved contour in cross section and has its front and rear edges reversely bent, this curved construction lending both strength and beauty of line to the cover. To secure it to the hub, the barrel portion 17 has secured to it adjacent its rear edge by welding or otherwise, an inwardly extending annulus 18 having its inner portion extending radially. The return bent rear edge 19 of the barrel portion 17 is turned over the rear, outer edge of the annulus 18 and forms therewith a reinforced widened edge seat for engagement with the body of the wheel.

The hub cover is secured in place by the same nuts 14, which secure the wheel body in place, and to this end the nuts may be provided with an annular shoulder 20 larger than the ball face 21 of the nut, the openings 22 in the radial portion 18' of the annulus 18 being larger than the diameter of the ball faces 21 of the nuts, but not as large as the diameter of the shoulder 20. When the nuts are screwed up, the ball face 20 of the nut engages the wheel disc to lock it in place, and the annular shoulder 20 engages the annulus 18 to secure the hub cover in place, by one and the same securing means. Preferably, in order to secure a firm seating of the hub cover against the wheel body at its outer peripheral seat 19 to avoid all rattle, should there be a space between the inner portion of the disc body and the annular shoulders 20 greater than the thickness of the radial portion 18' of the annulus 18, so that portion 18' would not be firmly clamped in place when the nuts are screwed home, the inwardly extending portion 18' of the annulus 18 is purposely biased outwardly, as shown in dotted lines, Fig. 1, so that it is placed in tension when the nuts are screwed up, and by its tension retains the edge 19 of the cover firmly seated against the wheel body.

At the front, the barrel portion 17 is turned inwardly at 23 and then rearwardly to form the narrow flange 24. This flange is for two purposes, to strengthen the edge of the barrel portion 17 where the closure cap is secured, and to give an axial width to the inturned edge substantially equal to the thickness of the corresponding inturned edge of a wire wheel hub shell, with which the closure cap is designed to be interchangeable.

The closure cap 25 is shown to be of generally dished disc form having its outer edge flanged rearwardly as at 26, and adapted to abut the inwardly extending part 23 of the hub cover barrel portion 17. The cap 25 is made readily detachable and is secured in such a way as to permit this, yet positively lock it in secured position.

This novel manner of securing the closure cap will now be described. Three locking prongs 28 are secured to the inside of the closure cap 25, either individually or through an integral ring joining them, two of them being spaced from each other circumferentially a somewhat smaller distance than they are spaced from the third. These two prongs 28 are each formed with an axial seat 29 adapted to seat against the flange 24 of the barrel portion of the hub cover and located slightly radially inwardly of the edge flange 26 of the closure cap 25. Beyond the axial seat 29 is a radial extension 30 extending outwardly slightly beyond the edge of the closure cap, and forming with the edge of the closure cap and the axial seat 29 a channel seat for snugly receiving the edge of the hub cover. These two closely spaced prongs may have a slight resiliency, and the edge of the hub cover barrel may thus be held between the edge of the cap closure and the mentioned prongs with a certain resilience.

In order to bring the cap readily into place and permit a corresponding ready removal when desired, the third prong 28 is associated with a member designated generally 31, movable in and out of locking position. In the present embodiment of my invention this third prong 28 is spaced at its outer free end a substantial distance from the cap closure to which it is secured at its inner end, its free end portion extending radially and terminating some distance inwardly of the outer periphery of the closure cap, sufficient to permit it to swing past the edge flange 24 of the hub cover barrel, when the other two prongs 28 are seated with their portions 29, 30 engaging the said edge flange.

A positively movable locking means is associated with the third prong 28, and in the present embodiment of my invention it consists of a rotary nut member 31 having a flat portion 32, an eccentric circular seat 33 and inwardly of said eccentric seat 33 an annular flange 34. The nut is mounted on a screw 35 having a beveled head 36 provided with a screw driver slot and seated in a corresponding countersunk seat in the body of the closure cap 25 and having its inner end 37 of reduced diameter journalled in a hole provided in the outer end of the associated prong 28. The screw and cam nut are so spaced from the edge of the hub cap that when the nut is turned so as to present its flat portion 32 toward the edge of the adjacent hub cover, the closure cap can be readily removed. When the nut is turned from this position by turning the screw 35 in the proper direction, the eccentric seat 33 will jam up against the edge flange 24 of the hub cover barrel until the resistance to turning the nut caused by such jamming action is greater than the friction of the screw threads between nut and screw, after which the turning of the screw will, because of the engagement of the abutment flange 34 on the nut behind the edge flange 24, draw the hub cap closure firmly to its seat. The frictional engagement of the various parts and the jamming of the cam surface against the edge flange 24 prevents any possible loosening of the clamp or any rattling of the hub cap, when locked in position. The locking action is a positive one and does not depend upon spring action.

In Fig. 4 I have shown the front end of a wire wheel hub shell 36 having an inturned flange 37, and a front set of tension spokes 38. The inturned flange 37 is of a thickness substantially equal to the combined thickness of the metal of the barrel portion 17 and the width of the edge flange 24 of the hub cover or adapter shown applied to disc wheel in Fig. 1, so that the hub cap closure 25 can readily be interchangeably secured to either a disc or compression spoked or wire wheel. In the case of the wire wheel the cap closure 25 is applied directly to the outer end of the hub shell, as 36, and in the case of a disc or compression spoked wheel, to an adapter or hub cover, as 17, having its forward open end formed to receive it.

What I claim is:—

1. A hub cover concealing the attaching means for bolted-on wheels comprising a substantially cylindrical barrel member encircling said attaching means and having its rear edge reversely curved and seated against the wheel body, and attaching means adapted in securing the barrel member to be placed under tension and adapted to hold said rear edge of the cover against the wheel body under such tension.

2. A hub cover concealing the attaching means for bolted-on wheels comprising a barrel member having an inner axial end adapted to abut a wheel body and a radially inwardly extending attaching means for securing it to the wheel body and by placing the said attaching means under tension to hold the rear edge of the same seated against the wheel body, said attaching means being located wholly within the hub cover.

3. In a bolted-on type of vehicle wheel, a hub cover concealing the attaching means including a substantially cylindrical barrel portion encircling and enclosing the attaching means and bearing a plurality of substantially radially extending flange portions, a cap arranged for locking engagement with one of the flanges of said barrel portion, bolting on means for the wheel, the said other flange of the barrel portion being adapted to be secured to a wheel body in flexed condition by said bolting on means.

4. A vehicle wheel comprising a hub having a flange, a wheel body having a mounting plate portion fitted against the front face of said flange, a detachable concave-shaped hub cap support having a radially inwardly extending flange abutting against said mounting plate and means acting through said flange, mounting plate and hub cap support, for securing said wheel body and hub cap support to said flange.

5. A vehicle wheel comprising a hub having a flange, a wheel body having a mounting plate portion fitted against the front face of said flange, a detachable concave-shaped hub cap support having a radially inwardly extending flange abutting against said mounting plate and an annular series of studs carried by said hub flange, passing through said mounting plate and the flange of said hub cap support for securing said wheel body and hub cap support to said hub flange.

RUSSELL S. BEGG.